United States Patent [19]

Nimmo et al.

[11] 3,876,813

[45] Apr. 8, 1975

[54] FORTIFICATION OF FLOUR AND FLOUR PRODUCTS WITH FERRIPOLYPHOSPHATE

[75] Inventors: Charles C. Nimmo, Lafayette; David A. Fellers, El Cerrito, both of Calif.

[73] Assignee: The United States of America as represented by the Secretary of Agriculture, Washington, D.C.

[22] Filed: Jan. 14, 1974

[21] Appl. No.: 433,327

[52] U.S. Cl. .................. 426/152; 426/19; 426/208; 426/375
[51] Int. Cl. ........................ A21d 2/02; A21d 13/00
[58] Field of Search .................... 426/208, 74, 375

[56] References Cited
UNITED STATES PATENTS
2,357,069  8/1944  Barackman ......................... 426/208

Primary Examiner—Raymond N. Jones
Attorney, Agent, or Firm—M. Howard Silverstein; Max D. Hensley; William Takacs

[57] ABSTRACT

Flour and flour products are enriched with ferripolyphosphate, a source of dietary iron. This additive provides a high level of nutritionally available iron, but, at the same time, does not possess the disadvantages, such as discoloration, development of off-flavor, and promotion of rancidification, that accompany the use of other iron-enriching compounds.

5 Claims, No Drawings

FORTIFICATION OF FLOUR AND FLOUR PRODUCTS WITH FERRIPOLYPHOSPHATE

DESCRIPTION OF THE INVENTION

This invention relates to and has among its objects novel methods for enriching flour and flour products with nutritionally available iron. In particular, it is an object of the invention to fortify such foods with a ferripolyphosphate (hereinafter referred to as FIP). Further objects of the invention will be evident from the following description wherein parts and percentages are by weight unless otherwise specified. The abbreviation "ppm" means parts per million.

Recently, iron deficiency anemia has been recognized as a major health problem, particularly among children and among women of child-bearing age. Efforts, therefore, have been made to provide iron-enriched food products. Since flour and products made therefrom are widely consumed, these foods seemed to be excellent candidates for carriers of iron additives. Compounds useful as iron additives must be both safe and assimilable, i.e., used effectively by the human body. In the art, such materials as reduced iron, ferric orthophosphate, ferric pyrophosphate, ferric sodium pyrophosphate, ferrous sulfate, ferrous gluconate, ferrous lactate, and ferrous fumarate are known and used as food additive sources of dietary iron. Unfortunately, the latter four materials, while providing a good source of dietary iron, are detrimental to the shelf-life of foods to which they are added. In other words, these compounds promote oxidation of the foods, thus substantially increasing rancidification of the material. The first four materials do not promote rancidification to any appreciable extent. However, incorporation of these materials in flour products results in undesirable discoloration and development of off-flavor. In addition, the bio-availability of the iron is low and in the case of reduced iron, somewhat unpredictable because of particle size variations.

The invention described herein provides means which obviate the problems outlined above. In accordance with the invention, FIP is incorporated into flour or foods made therefrom. FIP is an excellent source of nutritionally available iron, equalling that of currently employed iron additives. It is important to note, however, that FIP does not promote rancidification. Thus, foods containing FIP possess excellent storage properties. In addition, no development of off-flavor or discoloration of the food material occurs when FIP is added thereto. In short, FIP possesses all the advantages of the iron-enriching additives known in the art, but lacks the disadvantages inherent in their use.

It is especially important to note that FIP's high level of nutritionally-available iron as well as its lack of rancidification acceleration is a completely unexpected property. Compounds that provide iron with high biological availability also promote rancidification at a much higher rate than do compounds that provide iron of low assimilability. For example, although ferrous sulfate is a good source of dietary iron, it promotes rancidity in materials to which it is added. On the other hand, ferric orthophosphate, although not accelerating rancidity to any appreciable extent, does not provide iron of high biological availability. FIP provides a high level of assimilable iron and, at the same time, does not promote rancidification.

It should be noted that FIP does not cause instability in either wet or dry media. Accordingly, FIP is distinguished from commonly-used iron additives; such additives cause instability in wet systems.

In the following description attention is directed to the fortification of bread with FIP. It should be emphasized that this is by way of illustration and not limitation. In its broad ambit the invention can be applied to flour and flour products of all kinds, such as bread, cakes, cookies, doughnuts, and other bakery products; dry mixes for cakes, puddings, breads, rolls, etc.; noodles and other alimentary pastes; breakfast cereals, and the like.

As mentioned earlier, the invention involves the use of FIP to provide a source of dietary iron in flour and flour products. In proceeding in accordance with the invention, FIP is simply incorporated in flour which then constitutes, as such, a product of the invention. Moreover, the flour so-enriched with FIP can be further processed in known manner to yield any of the flour products exemplified above. In a typical embodiment of the invention, FIP is mixed into flour to produce a uniform blend. Where a vitamin-fortified product is being produced, FIP is incorporated into the flour together with the usual substances used for vitamin enrichment. In the production of baked goods, FIP is incorporated with the flour at the same time as other ingredients, such as sugar, salt, non-fat milk, yeast, and the like. On the other hand, FIP may be pre-mixed with a small amount of flour, and the resultant material mixed with the remaining ingredients as above. There is, however, nothing special about these methods; FIP can be incorporated at any time and by any means convenient to a commercial operation having as its end result the production of a flour product.

The amount of FIP incorporated in the flour depends merely on the level of iron desired to be present in the product. It is obvious that addition of any amount of FIP will increase the proportion of nutritionally-available iron in the final product. Typically, FIP is used in an amount to provide about 10 to 200 parts of iron (Fe) per 1,000,000 parts of flour. In preparing products falling within the control of the Food & Drug Administration, one would use the level of FIP to provide the amount of iron required thereby. Based on current requirements, one would incorporate enough FIP to provide an iron (Fe) concentration of 88 ppm. However, since the requirements of FDA may change, the amount of FIP may be adjusted to conform to the changed requirements.

The ferripolyphosphates (FIP) used in accordance with the invention are known compounds. They have the empirical formula $Fe_2(OH)_x(PO_3)_y \cdot nH_2O$ wherein $x$ has any value from 0.5 to 2, $y$ is 6 minus $x$, and n has any value from 0 to 15. The molar $Fe_2O_3/P_2O_5$ ratio of FIP lies between 0.35 and 0.5. It should be pointed out that the synthesis of FIP forms no part of the present invention, since the preparation of FIP is well-known in the art, e.g., as described in U.S. Pat. No. 3,403,971 (Hazel et al). It should be noted also that, although the synthesis of FIP is described, there is no suggestion that this material would be useful as a source of dietary iron. In general, iron-phosphate compounds are not good sources of assimilable iron.

The invention is further demonstrated by the following illustrative examples.

EXAMPLE 1

White bread was prepared according to standard procedures. The bread formula is given below. With regard to the iron source, in one instance FIP (21% Fe) was used therefor; in another, ferrous sulphate was used to provide a control.

| Ingredient | Parts (by weight) | |
| --- | --- | --- |
| Flour | 100 | |
| Malted wheat flour | 0.2 | |
| Salt | 1.5 | |
| Sugar | 6.0 | |
| Dry milk solids | 4.0 | |
| Shortening | 3.0 | |
| Yeast | 2.0 | |
| Potassium bromate | 5 | ppm |
| Water | 60–62 | |
| Iron source | 88 | ppm (of Fe) |

The ingredients were mixed and held for 3 hours and 55 minutes. Then, the loaves were baked at 425° F. for 25 minutes.

The baked loaves were then used in rat-feeding studies, and the bio-availability was determined by the hemoglobin repletion method. The results are tabulated below:

| Iron source | Bio-availability, % |
| --- | --- |
| FIP | 85 |
| Ferrous sulphate | 98 |

EXAMPLE 2

A simple test for reactivity of iron compounds is as follows:

The candidate iron compound is added to a slurry of flour and water and the mixture observed for discoloration. It has been determined that rapid discoloration indicates a high degree of reactivity, which is an indication of a tendency to promote rancidification.

In conducting the tests, slurries were made containing 10 g. of barley flour per 50 ml. of water. To different lots of the slurry there was added either FIP (21% Fe) or ferrous sulphate in an amount to provide an Fe concentration of 1,000 ppm. The slurries were allowed to stand, and the following results were noted:

| Iron source | Discoloration |
| --- | --- |
| FIP | None (even after 60 min.) |
| Ferrous sulfate | Immediate darkening (developed gray-purple color) |

EXAMPLE 3

190.5 mg. of FIP containing 21% Fe (thus providing 40 mg. of Fe) was intimately mixed with one pound of bleached, bromated, commercial flour. A 10-gram sample of this mixture was placed in a tightly-capped bottle and stored at 50° C.

Two controls were prepared: In control A, ferrous sulfate (in an amount to provide 40 mg. of Fe) was intimately mixed with 1 pound of the flour described above. Control B was the same flour without additives.

A 10-gram sample of each control was placed in a tightly-capped bottle and stored at 50° C.

The odors of the samples were compared at intervals by an olfactory test, using the triangle test method for detecting differences between samples. After one day a mildly rancid odor was detected in Control A, whereas no detectable rancidity was found in either the FIP-flour sample or in Control B after 33 days. Control A after 33 days was strongly rancid.

EXAMPLE 4

Cakes were prepared according to standard procedures. The cake formula is given below. With regard to the iron source, in one instance FIP (21% Fe) was used. In another, ferrous sulphate was used as a control.

| Ingredient | Parts (by weight) | |
| --- | --- | --- |
| Cake flour | 100 | |
| Sugar | 108 | |
| Corn sugar | 2.3 | |
| Salt | 2.3 | |
| Non-fat milk solids | 7.0 | |
| Baking powder | 3.8 | |
| Dried egg white | 7.3 | |
| Dried egg yolks | 0.7 | |
| Shortening | 35 | |
| Iron source | 88 | ppm (of Fe) |

The ingredients were mixed together and the resulting batter poured into pans and baked in the usual way.

Availability of the iron was determined as in Example 1.

The results are tabulated below:

| Iron source | Bio-availability, % |
| --- | --- |
| FIP | 87 |
| Ferrous sulphate | 81 |

Having thus described the invention, what is claimed is:

1. A composition comprising flour and a ferripolyphosphate in an amount effective to increase the iron nutritional value thereof, said ferripolyphosphate having a molar $Fe_2O_3/P_2O_5$ ratio between 0.35 and 0.5 and the empirical formula $$Fe_2(OH)_x(PO_3)_y \cdot nH_2O$$

wherein $x$ has any value from 0.5 to 2, $y$ is 6 minus $x$, and $n$ has any value from 0 to 15.

2. A composition consisting of flour and a ferripolyphosphate having a molar $Fe_2O_3/P_2O_5$ ratio between 0.35 and 0.5 and the empirical formula $$Fe_2(OH)_x(PO_3)_y \cdot nH_2O$$

wherein $x$ has any value from 0.5 to 2, $y$ is 6 minus $x$, and $n$ has any value from 0 to 15, said ferripolyphosphate being in an amount to provide about 10 to 200 ppm. of iron.

3. A composition comprising a flour product and a ferripolyphosphate in an amount effective to increase the iron nutritional value, said ferripolyphosphate having a molar $Fe_2O_3/P_2O_5$ ratio between 0.35 and 0.5 and the empirical formula -

$$Fe_2(OH)_x(PO_3)_y \cdot nH_2O$$

wherein $x$ has any value from 0.5 to 2, $y$ is 6 minus $x$, and $n$ has any value from 0 to 15.

4. The composition of claim 3 wherein the flour product is bakery goods.

5. A process for increasing the iron nutritional value of flour and flour products, which comprises -
adding thereto a ferripolyphosphate in an amount effective to increase the iron nutritional value thereof,
said ferripolyphosphate having a molar $Fe_2O_3/P_2O_5$ ratio between 0.35 and 0.5 and the empirical formula $$Fe_2(OH)_x(PO_3)_y \cdot nH_2O$$

wherein $x$ has any value from 0.5 to 2, $y$ is 6 minus $x$, and $n$ has any value from 0 to 15.

* * * * *